United States Patent
González Valdés et al.

(10) Patent No.: US 9,771,111 B2
(45) Date of Patent: Sep. 26, 2017

(54) SPARE WHEEL LIFT MECHANISM FOR A MOTOR VEHICLE

(71) Applicant: FORD GLOBAL TECHNOLOGIES, LLC, Dearborn, MI (US)

(72) Inventors: Armando González Valdés, Nicolas Romero (MX); Oscar Monroy Vallejo, Mexico City (MX); Jazael Garzón Aztatzi, Cuatitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/003,117

(22) Filed: Jan. 21, 2016

(65) Prior Publication Data
US 2017/0210431 A1    Jul. 27, 2017

(51) Int. Cl.
B62D 43/00      (2006.01)
B62D 43/06      (2006.01)
B62D 43/10      (2006.01)

(52) U.S. Cl.
CPC ........... B62D 43/002 (2013.01); B62D 43/10 (2013.01); B62D 43/00 (2013.01); B62D 43/06 (2013.01)

(58) Field of Classification Search
CPC ...... B62D 43/00; B62D 43/002; B62D 43/06; B62D 43/10
USPC ........... 224/42.12, 42.21; D12/202; 296/37.2
See application file for complete search history.

(56) References Cited

U.S. PATENT DOCUMENTS

| | | | | |
|---|---|---|---|---|
| 1,860,920 A | * | 5/1932 | Barker | B62D 43/02 224/42.12 |
| 2,036,472 A | * | 4/1936 | Grimshaw | B62D 43/06 224/42.13 |
| 2,063,092 A | * | 12/1936 | Groden | B62D 43/10 296/37.2 |
| 2,063,598 A | * | 12/1936 | Franklin | B62D 43/08 224/42.13 |
| 2,547,083 A | * | 4/1951 | Lundgren | B62D 43/10 224/496 |
| 3,307,734 A | | 3/1967 | Campbell | |
| 3,365,084 A | * | 1/1968 | Fernicola | B60R 5/04 224/42.13 |

(Continued)

FOREIGN PATENT DOCUMENTS

CN    200992238 Y    12/2007
CN    201559723 U    8/2010

(Continued)

OTHER PUBLICATIONS

English machine translation of CN200992238Y.
English machine translation of CN201559723U.
English machine translation of JP2006137329A.

*Primary Examiner* — Justin Larson
(74) *Attorney, Agent, or Firm* — Vichit Chea; King & Schickli, PLLC

(57) ABSTRACT

A spare wheel lift mechanism is provided for a motor vehicle. That spare wheel lift mechanism includes a holder for receiving and holding the spare wheel and a support for the holder. The support is displaceable between a wheel storage position within a storage compartment of the motor vehicle and an access position wherein the spare wheel projects at least partially outside the body of the motor vehicle for easy access. A method of assisting an individual with access to a spare wheel stored in a storage compartment of a motor vehicle is also provided.

16 Claims, 11 Drawing Sheets

(56) References Cited

U.S. PATENT DOCUMENTS

| | | | | |
|---|---|---|---|---|
| 3,460,695 A | * | 8/1969 | Steele | B62D 43/04 224/42.21 |
| 3,559,829 A | * | 2/1971 | Shamel | B62D 43/10 224/42.21 |
| 3,627,158 A | * | 12/1971 | Kobasic | B60R 5/04 414/462 |
| 4,073,395 A | * | 2/1978 | Clement | B60R 5/04 224/548 |
| 4,230,246 A | * | 10/1980 | Wilson | B62D 43/10 224/42.13 |
| 4,455,948 A | * | 6/1984 | Torres | A47B 31/06 108/138 |
| 4,485,945 A | | 12/1984 | Ankeny | |
| 4,573,855 A | | 3/1986 | Braswell | |
| 4,805,817 A | * | 2/1989 | Helterbrand | B62D 43/04 224/42.21 |
| 4,884,729 A | | 12/1989 | Barkouskie | |
| 5,183,192 A | * | 2/1993 | Mrozowski | B62D 43/02 224/42.21 |
| 5,730,338 A | * | 3/1998 | Travis | B62D 43/02 224/401 |
| 5,951,232 A | * | 9/1999 | Yu | B62D 43/10 224/42.21 |
| 5,954,246 A | * | 9/1999 | Golovoy | B62D 43/002 224/42.21 |
| 5,993,133 A | * | 11/1999 | Murray | B62D 43/045 224/42.12 |
| 6,389,670 B2 | | 5/2002 | Morin et al. | |
| 6,554,253 B1 | | 4/2003 | Dobmeier et al. | |
| 6,709,038 B2 | * | 3/2004 | Bienert | B60R 5/04 296/26.1 |
| 7,410,081 B2 | * | 8/2008 | McClure | B62D 43/10 224/403 |
| 7,861,902 B2 | * | 1/2011 | Osenkowski | B62D 43/002 224/42.21 |
| 2012/0048897 A1 | | 3/2012 | Fowler et al. | |

FOREIGN PATENT DOCUMENTS

| | | | | |
|---|---|---|---|---|
| DE | 19849501 A1 | * | 5/2000 | B62D 43/10 |
| DE | WO 0030917 A1 | * | 6/2000 | B62D 43/002 |
| DE | 19901515 A1 | * | 7/2000 | B62D 43/10 |
| DE | 19849501 C2 | * | 9/2001 | B62D 43/10 |
| DE | 10146782 A1 | * | 7/2003 | B62D 43/10 |
| FR | 2925461 A1 | * | 6/2009 | B62D 21/15 |
| FR | 2925461 B1 | * | 1/2010 | B62D 21/15 |
| IR | EP 2199191 A1 | * | 6/2010 | B62D 43/002 |
| JP | 2006137329 A | | 6/2006 | |

* cited by examiner

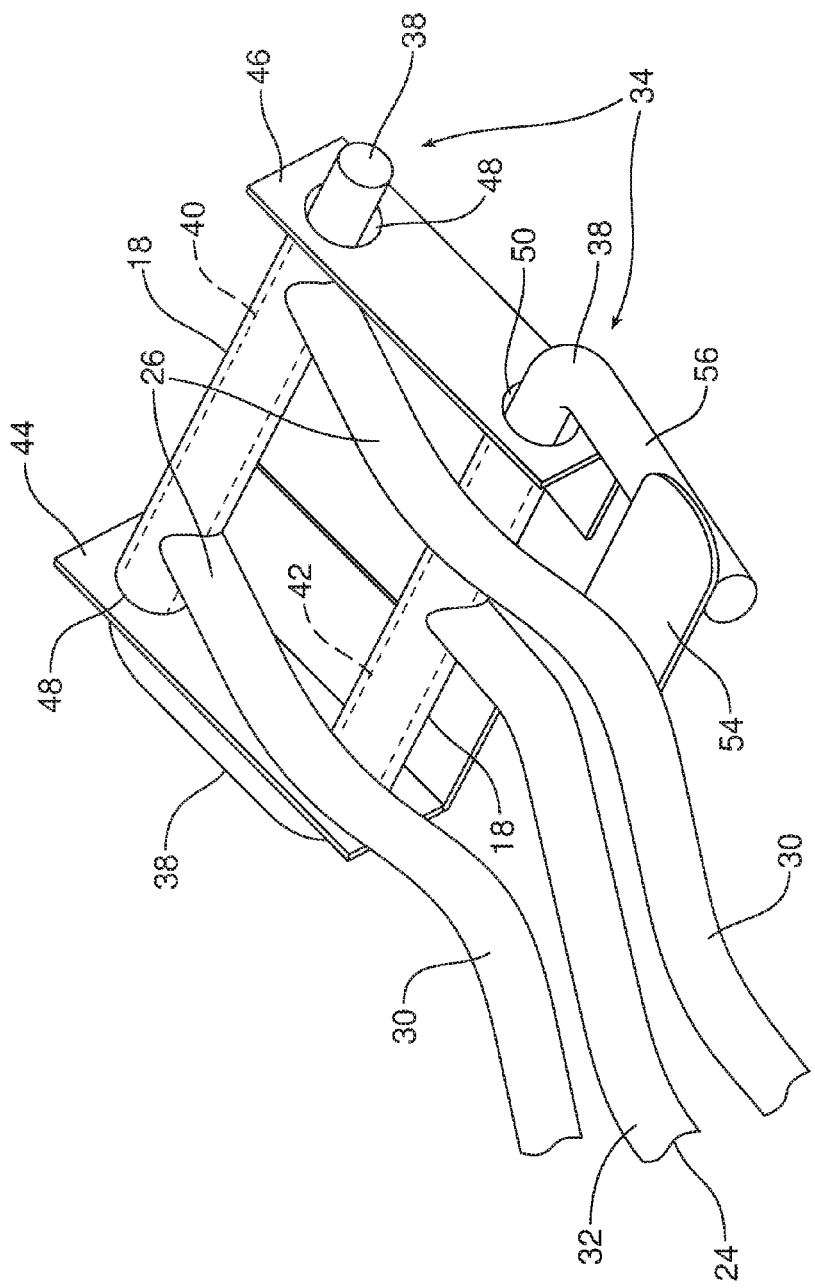

SPARE WHEEL LIFT MECHANISM FOR A MOTOR VEHICLE

TECHNICAL FIELD

This document relates generally to the motor vehicle equipment field and, more particularly, to a spare wheel lift mechanism that significantly reduces the effort required to remove a spare wheel from a wheel well in the storage area or trunk of a motor vehicle.

BACKGROUND

Accessing and removing a spare wheel from a trunk represents a high challenge for many vehicle operators. In many instances the spare wheel is held in a well underneath a false floor of the storage area or trunk. Typically, the spare wheel is very difficult to reach causing the operator to assume an unnatural and even strained position that is not conducive to lifting the spare wheel from the well. Here it should be appreciated that the spare wheel including the tire weighs perhaps 25 to 30 pounds and significant strength is required to remove the spare wheel from the trunk.

This document relates to a new and improved spare wheel lift mechanism that includes a torsion bar that provides a biasing force that counteracts the weight of the spare wheel. The lift mechanism assists in lifting the spare wheel from the storage position in a wheel well to an access position where the spare wheel may be removed from the device and more easily handled by the vehicle operator.

SUMMARY

In accordance with the purposes and benefits described herein, a spare wheel lift mechanism is provided for a motor vehicle. That spare wheel lift mechanism comprises a holder for receiving and holding the spare wheel and a support for the holder. The spare wheel lift mechanism is displaceable between a wheel storage position within a storage compartment of the motor vehicle and an access position wherein the spare wheel projects at least partially outside the body of the motor vehicle.

In one possible embodiment, the support of the spare wheel lift mechanism includes a linkage having a first end connected to the motor vehicle and a second end connected to the holder. That support may further include a base fixed to the motor vehicle and a bracket fixed to the holder. Further, a first hinge is provided connecting the first end of the linkage to the base and a second hinge is provided connecting the second end of the linkage to the bracket.

In one possible embodiment, the linkage includes a first link and a second link. In such an embodiment, the first hinge may be a dual hinge connecting the first link and the second link to the base. Further, the second hinge may be a dual hinge connecting the first link and the second link to the bracket.

In one possible embodiment, a counter balancing element such as a torsion bar is provided for connecting the support to the holder and biasing the support toward the access position. That torsion bar may include a first section forming a first hinge pin for the first hinge and a second section forming a second hinge pin for the first hinge. Further, the linkage may include a flange and the torsion bar may include a third section that engages the flange thereby providing a biasing force that counteracts the weight of the spare wheel held on the holder.

In one possible embodiment, the base includes two opposed flanges having a first set of opposed apertures and a second set of opposed apertures. In such an embodiment, the first section of the torsion bar extends through the first set of opposed apertures and the second section of the torsion bar extends through the second set of opposed apertures.

In accordance with an additional aspect, a motor vehicle is provided incorporating the spare wheel lift mechanism described in this document.

In accordance with yet another aspect, a method is provided of assisting an individual with access to a spare wheel stored in a storage compartment such as a wheel well in a motor vehicle. That method may be described as comprising the steps of holding the spare wheel on a support that is displaceable between a storage position within the storage compartment and a raised, access position and biasing the support toward the access position so as to reduce the effort required of the individual to raise the support and the spare wheel.

The method may further include the step of using a torsion bar to bias the support toward the access position. Further, the method may include holding the spare wheel so that the spare wheel at least partially projects from the body of the motor vehicle when in the access position. This makes the spare wheel far more accessible and easier to handle for the individual.

In the following description, there are shown and described several preferred embodiments of the spare wheel lift mechanism. As it should be realized, the spare wheel lift mechanism is capable of other, different embodiments and its several details are capable of modification in various, obvious aspects all without departing from the spare wheel lift mechanism as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spare wheel lift mechanism and together with the description serve to explain certain principles thereof. In the drawing figures:

FIGS. 4a and 4b are respective, detailed side perspective views illustrating a torsion bar that biases the support toward the access position.

Figure 5A:
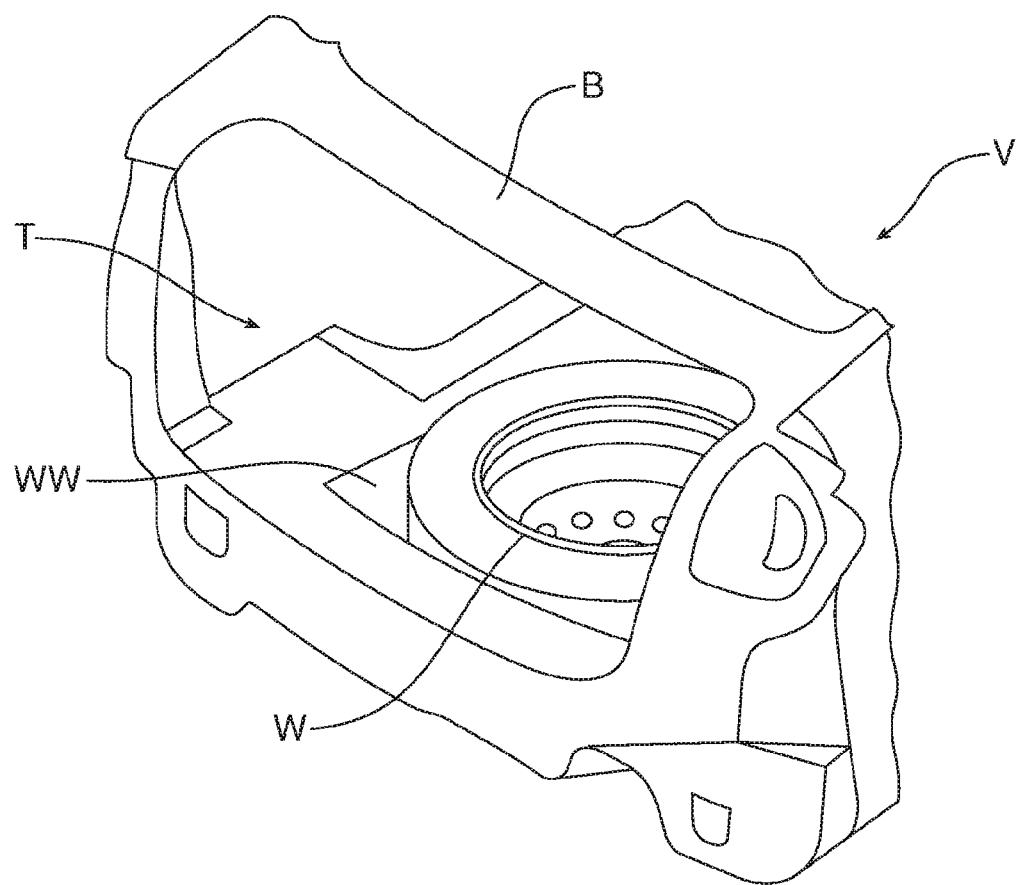
FIGS. 5a and 5b are respective perspective and side elevational views of the spare wheel lift mechanism and spare wheel in the storage position.
Figure 5B:
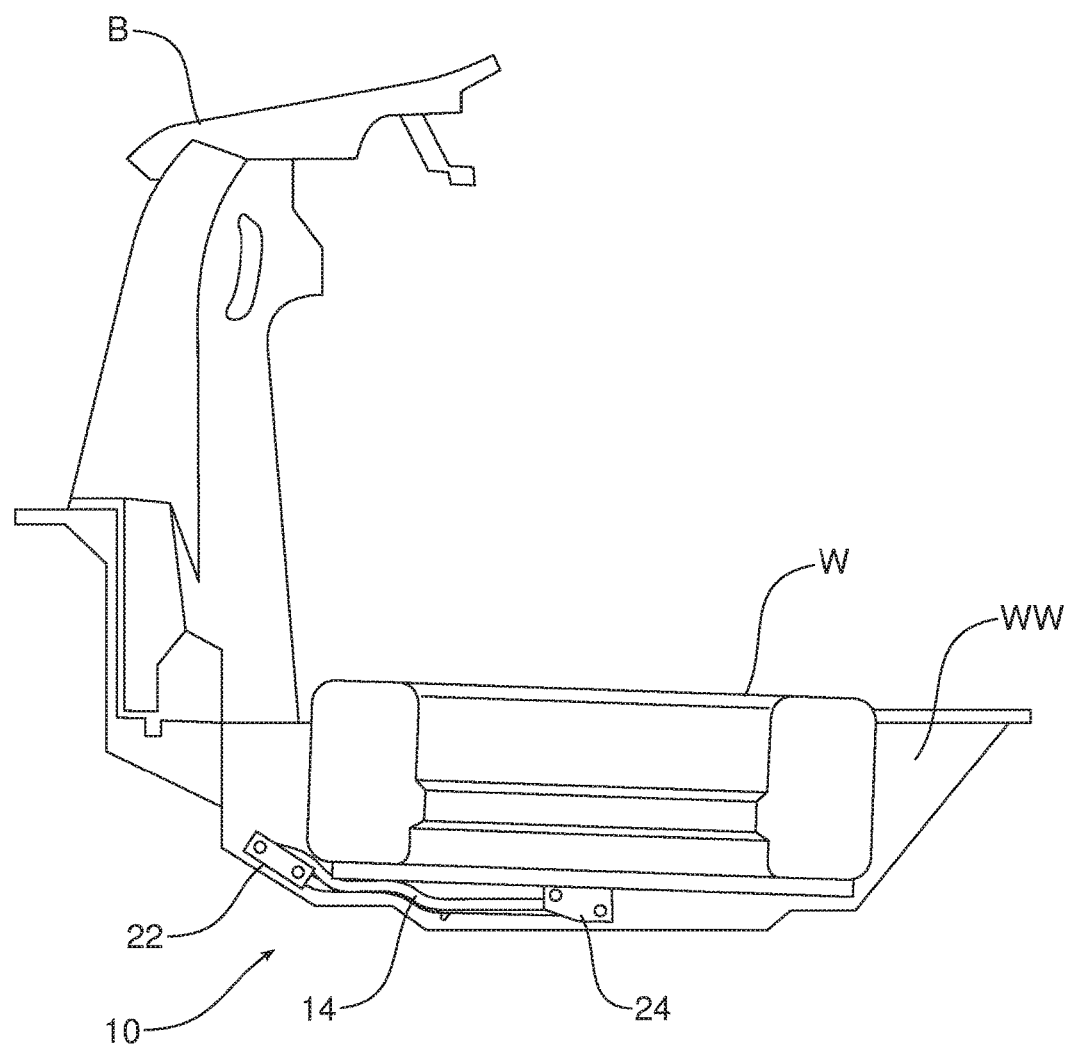
Figure 6A:
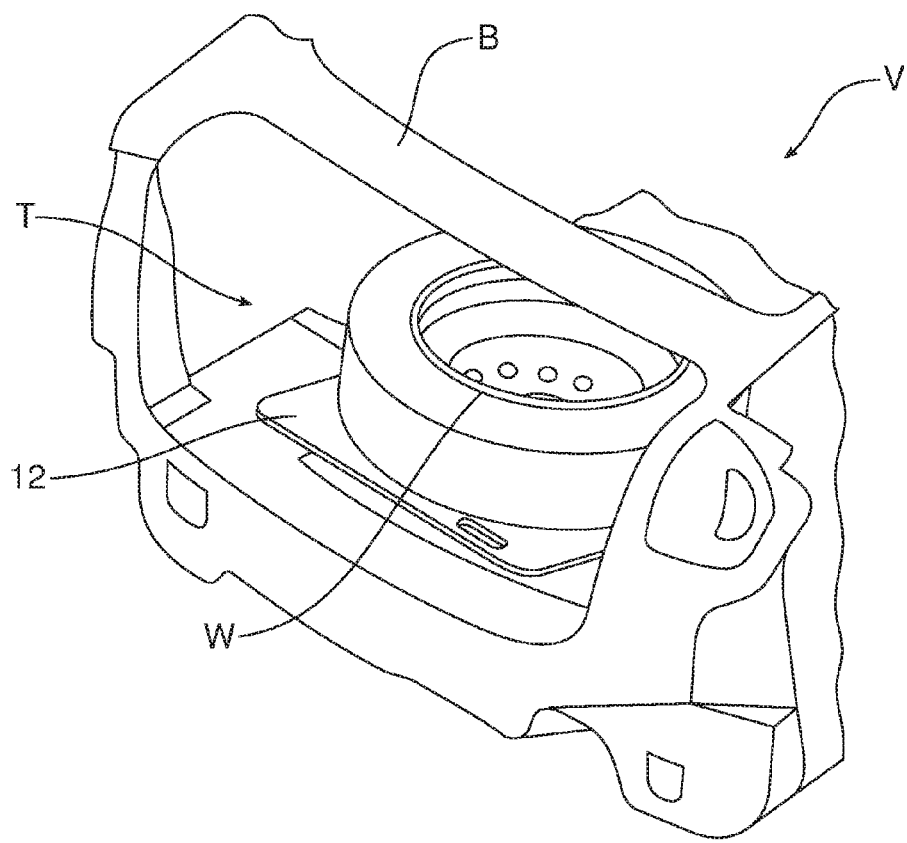
Figure 6B:
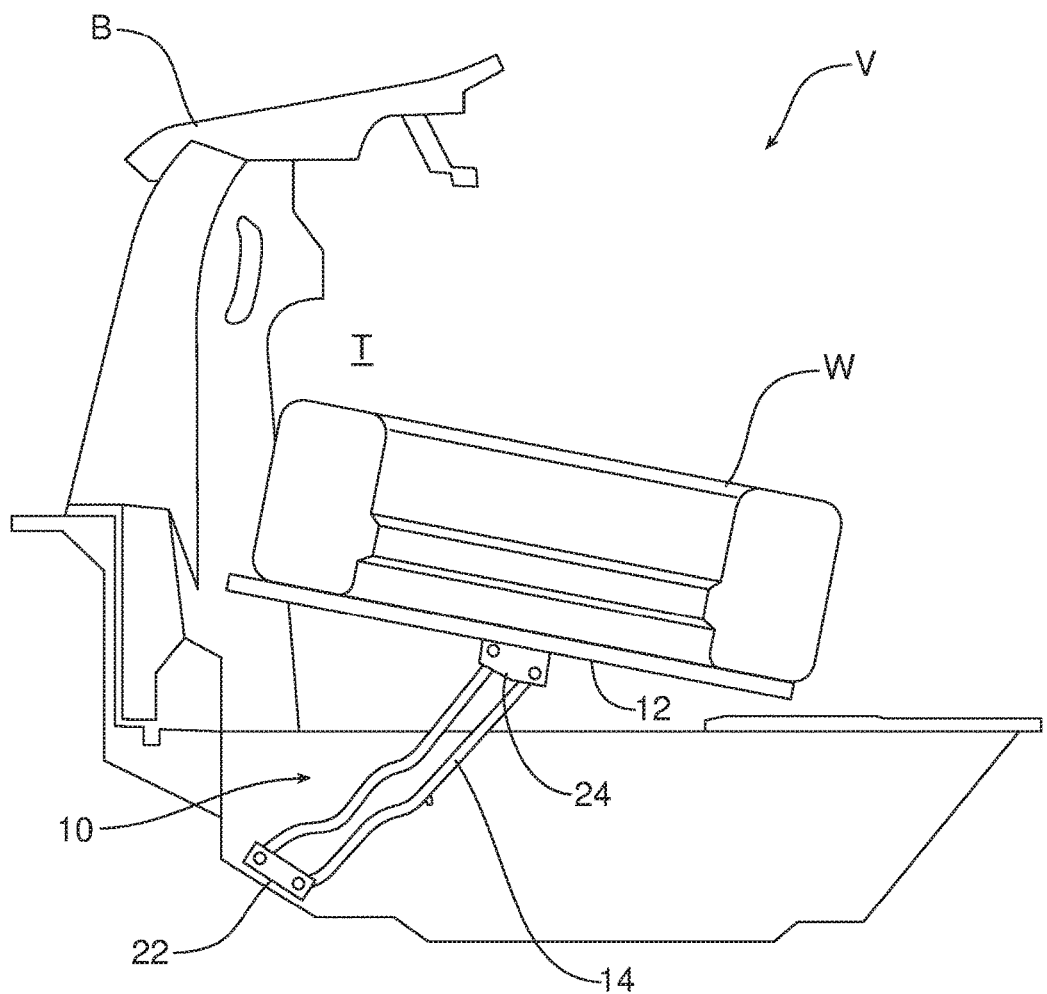
Figure 7A:
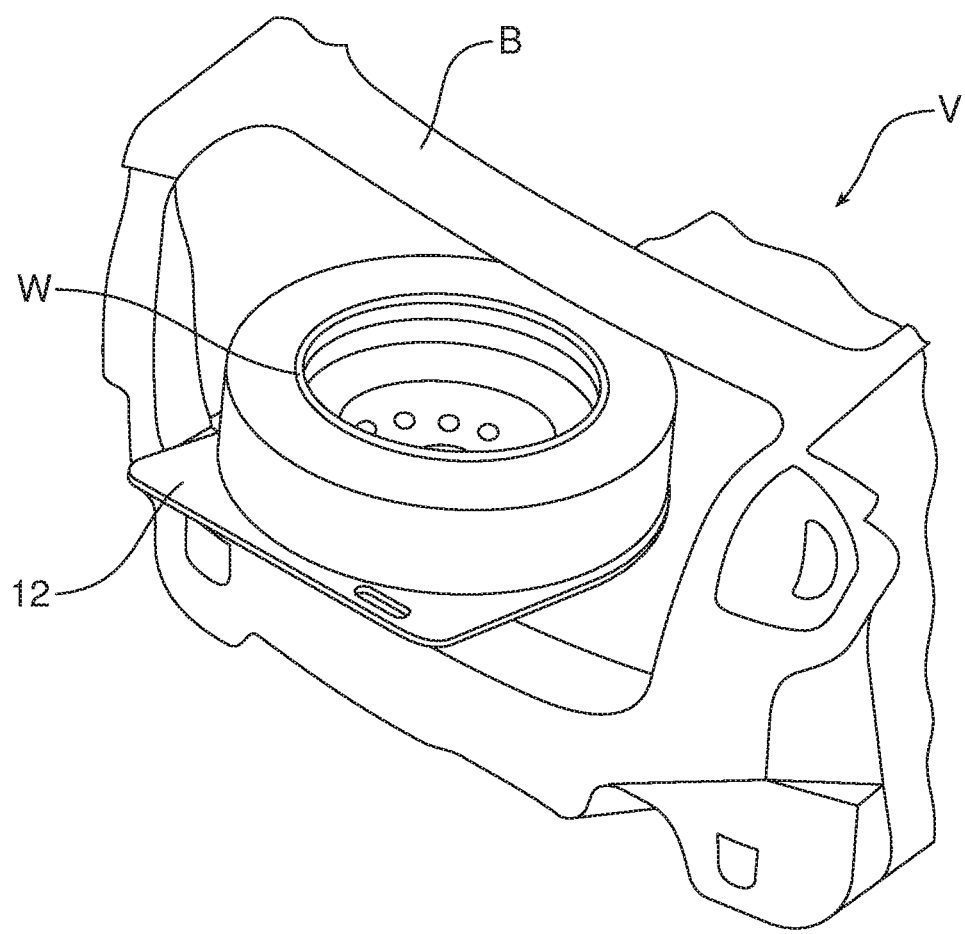
Figure 7B:
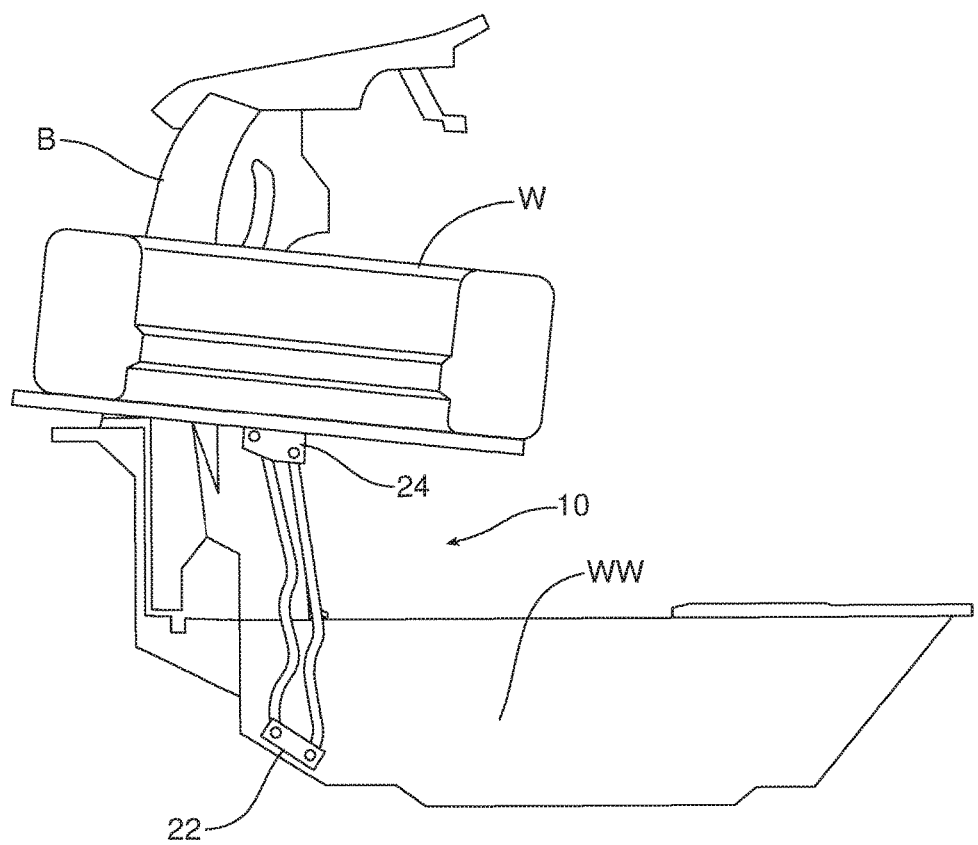

FIGS. 6a and 6b are respective perspective and side elevational views of the spare wheel lift mechanism and spare wheel in the process of being raised between the storage position illustrated in FIGS. 5a and 5b and the access position illustrated in FIGS. 7a and 7b.

FIGS. 7a and 7b are respective perspective and side elevational views illustrating the spare wheel lift mechanism and spare wheel in the fully raised, access position.

Reference will now be made in detail to the present preferred embodiments of the spare wheel lift mechanism, examples of which are illustrated in the accompanying drawing figures.

DETAILED DESCRIPTION

Reference is now made to FIGS. 1-3, 4a and 4b illustrating the spare wheel lift mechanism 10. The spare wheel lift mechanism 10 includes a holder 12 for receiving and holding a spare wheel W (see also FIGS. 5a-7b) and a support 14 for the holder. As illustrated, the support 14 is displaceable between a wheel storage position, illustrated in FIG. 1, within a storage compartment of a motor vehicle (see also FIGS. 5a and 5b) and an access position (FIG. 3) wherein the spare wheel W projects at least partially outside the body B of the motor vehicle V (see FIGS. 7a and 7b).

As illustrated in FIGS. 1-3, 4a and 4b, the support 14 of the illustrated embodiment comprises a linkage. The linkage 14 has a first end 18 connected to the motor vehicle V by means of a base 22 and a second end 20 connected to the holder 12 by means of a bracket 24.

More specifically, in the illustrated embodiment, the linkage 14 includes a first link 26 and a second link 28. In the illustrated embodiment the first link 26 includes two longitudinal elements 30 while the second link 28 includes a single longitudinal element 32. A first hinge, generally designated by reference numeral 34 connects the first end of the linkage 14 to the base 22 and a second hinge 36 connecting the second end of the linkage to the bracket 24. As should be appreciated, both the first hinge 34 and the second hinge 36 are dual hinges in the illustrated embodiment.

Figure 1:
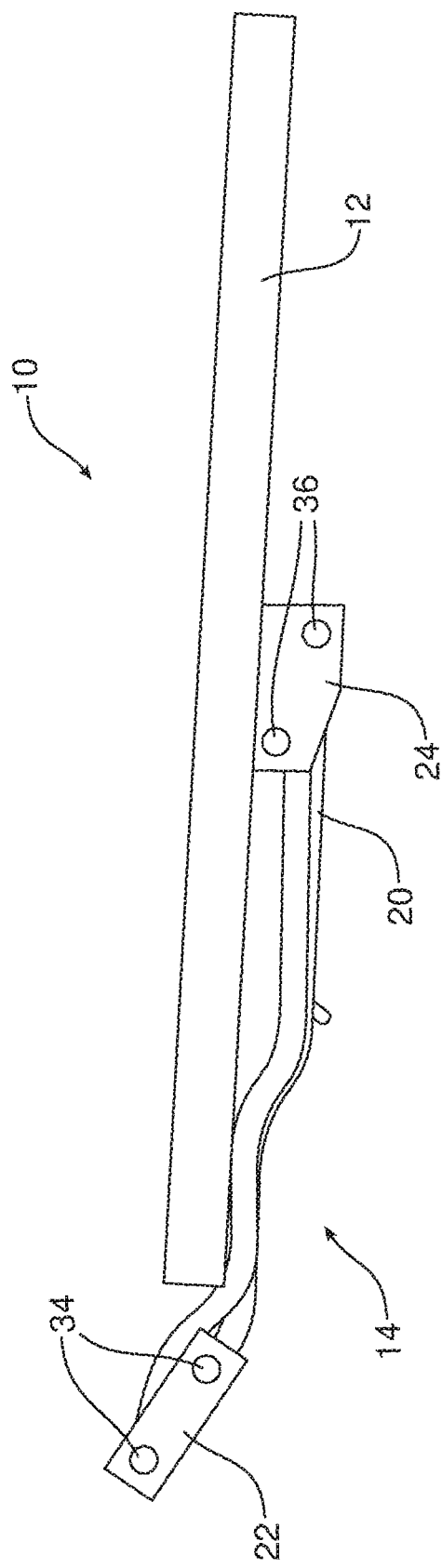
FIG. 1 is a side elevational view of the spare wheel lift mechanism in the storage position.
Figure 2:
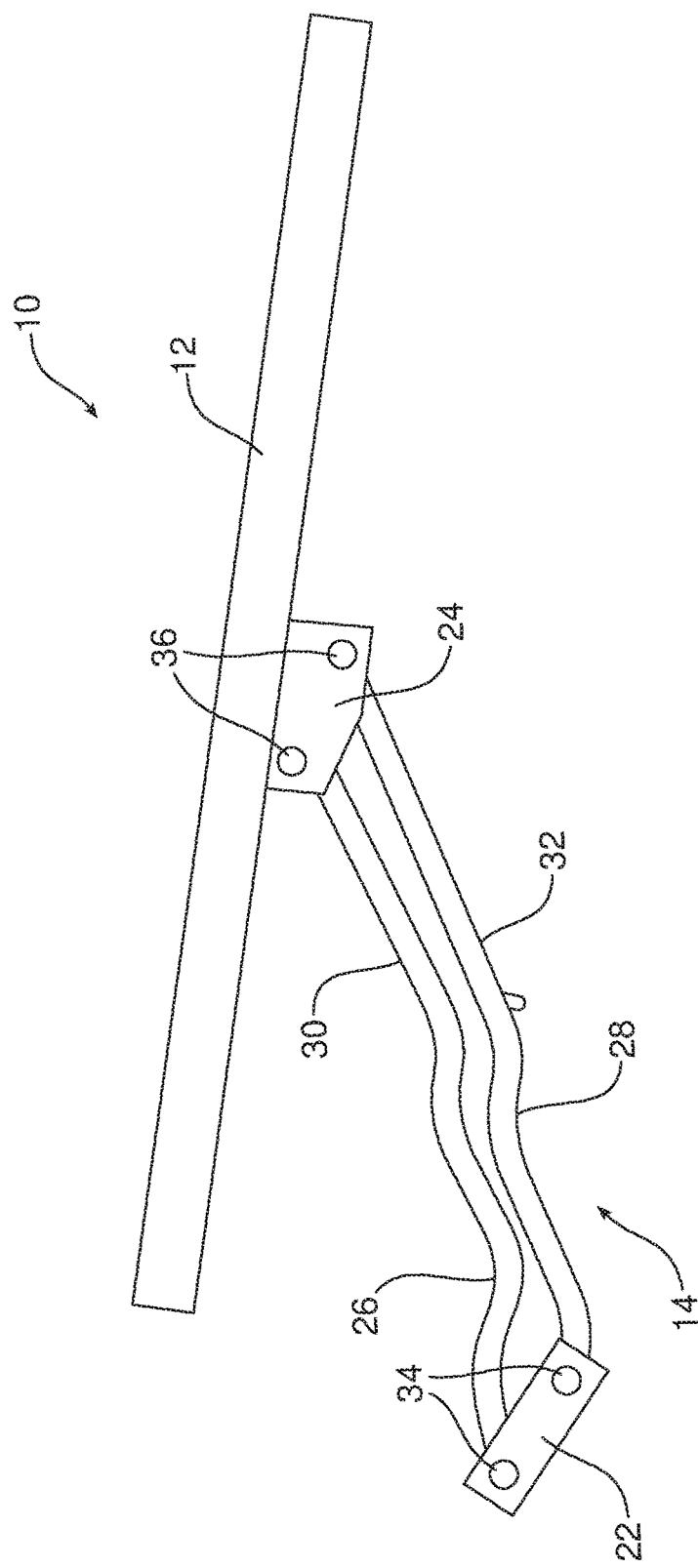
FIG. 2 is a side elevational view of the spare wheel lift mechanism as it is being raised from the storage position to the access position.
Figure 3:
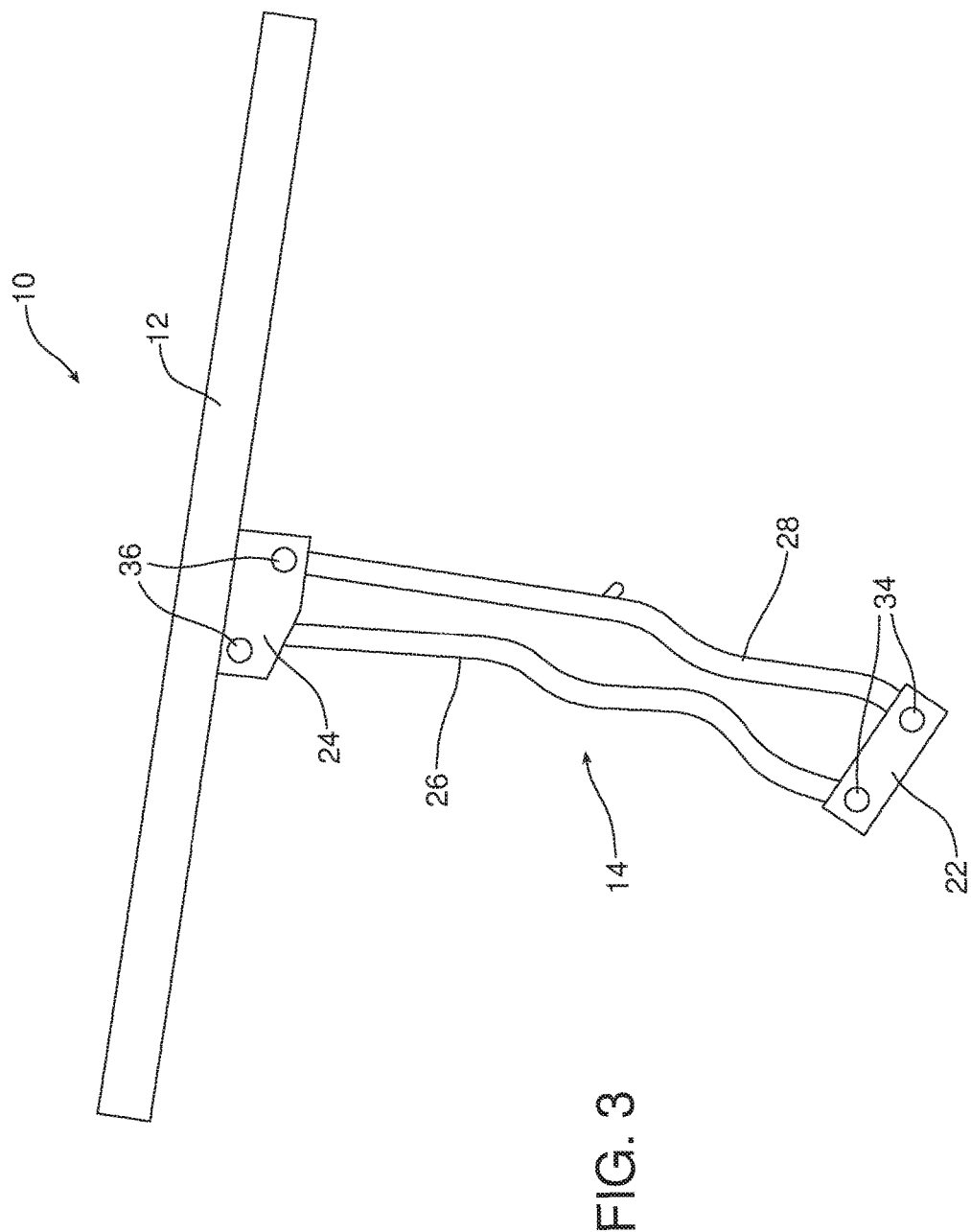
FIG. 3 is a side elevational view of the spare wheel lift mechanism in the raised, access position.
Figure 4B:
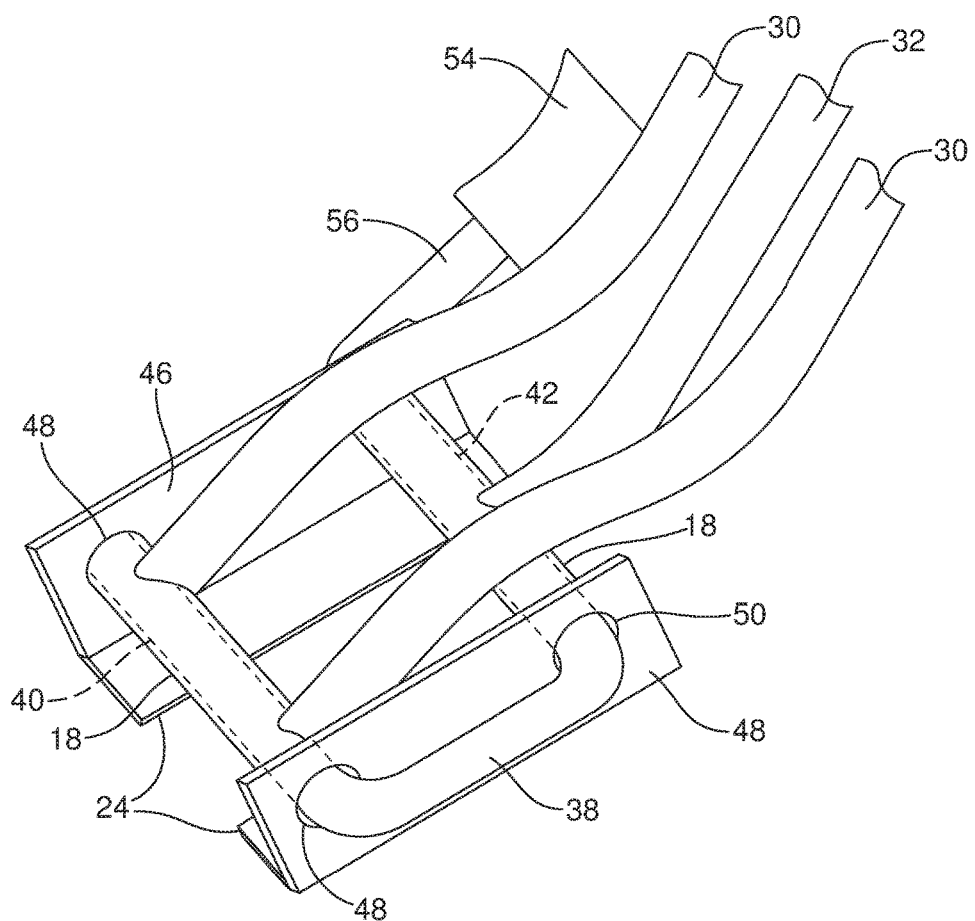

As best illustrated in FIGS. 4a and 4b, a counter balancing element, in the form of a torsion bar 38, biases the support 14 and, therefore, the holder 12 and spare wheel W held thereon toward the access position illustrated in FIGS. 3, 7a and 7b. As illustrated, the torsion bar 38 includes a first section or segment 40 forming a first hinge pin for the first hinge 34 and a second section or segment 42 forming a second hinge pin for the first hinge. More specifically, as illustrated, the base 22 includes 2 opposed flanges 44, 46 defining a first set of opposed apertures 48 and a second set of opposed apertures 50. The first section 40 of the torsion bar 38 extends through the first set of opposed apertures 48 and the tubular end 18 of the first link 26 while the second section 42 of the torsion bar extends through the second set of opposed apertures 50 and the tubular end 18 of the second link 28.

As also illustrated in FIGS. 4a and 4b, the linkage 14 includes a flange 54 and the torsion bar 38 includes a third section 56 that engages the flange. It is through this engagement that the torsion bar 38 provides a lifting force on the linkage 14 that counter balances the weight of the spare wheel lift mechanism 10 (and the spare wheel W supported on the holder 12) allowing one to easily move the mechanism from the storage position to the access position with minimal effort.

Reference is now made to FIGS. 5a, 5b, 6a, 6b, 7a and 7b which illustrate a method of assisting an individual with access to a spare wheel W stored in a storage compartment, such as a wheel well WW of a motor vehicle V. That method may be broadly described as including the steps of holding the spare wheel W on a support 14 that is displaceable between a storage position (illustrated in FIGS. 5a and 5b) and a raised, access position (illustrated in FIGS. 7a and 7b). Further, the method includes biasing the support 14 toward the access position so as to reduce the effort required of the individual to raise the support 14 and the spare wheel W. More specifically, the method includes using a torsion bar 38 to bias the support 14 toward the access position. Further, the method includes holding the spare wheel W so that the spare wheel at least partially projects from the body B of the motor vehicle V when in the access position (see FIGS. 7a and 7b).

When an individual wishes to access the spare wheel W in the wheel well WW, that individual removes the false floor (not shown) of the storage compartment or trunk T revealing the spare wheel W in the wheel well WW. The individual then reaches into the trunk to engage the spare wheel W and pulls the wheel with minimal effort toward the trunk opening. As described above, the torsion bar 38 counter balances the weight of the mechanism 10 and the spare wheel W allowing one to easily raise the spare wheel from the wheel well WW toward the fully raised, access position. FIGS. 6a and 6b illustrate the mechanism 10 and spare wheel W as it is being so raised.

When fully raised into the access position as shown in FIGS. 7a and 7b, the holder 12 holding the spare wheel W projects slightly through the trunk opening beyond the body B of the motor vehicle. Raised in this rearward position, the individual may easily disconnect the spare wheel W from the holder 12 and drop the wheel to the ground so as to allow the changing of a tire of the motor vehicle V.

The foregoing has been presented for purposes of illustration and description. It is not intended to be exhaustive or to limit the embodiments to the precise form disclosed. Obvious modifications and variations are possible in light of the above teachings. For example, in the illustrated embodiment the counter balancing element is a torsion bar as such bar is the most packing efficient solution. In other embodiments, the counter balancing element may take the form of, for example, a gas strut, a torsion spring and an electric motor. All such modifications and variations are within the scope of the appended claims when interpreted in accordance with the breadth to which they are fairly, legally and equitably entitled.

What is claimed:

1. A spare wheel lift mechanism for a motor vehicle, comprising:
   a holder for receiving and holding a spare wheel;
   a support for said holder, said spare wheel lift mechanism being displaceable between a wheel storage position within a storage compartment of said motor vehicle and an access position wherein said spare wheel projects at least partially outside a body of said motor vehicle; and
   a counter balancing element for biasing said support toward said access position, said counter balancing element being formed by a torsion bar.

2. The spare wheel lift mechanism of claim 1, wherein said support includes a linkage having a first end connected to said motor vehicle and a second end connected to said holder.

3. The spare wheel lift mechanism of claim 2, wherein said support further includes a base fixed to said motor vehicle and a bracket fixed to said holder.

4. The spare wheel lift mechanism of claim 3, wherein said support further includes a first hinge connecting said first end of said linkage to said base and a second hinge connecting said second end of said linkage to said bracket.

5. The spare wheel lift mechanism of claim 4, wherein said linkage includes a first link and a second link.

6. The spare wheel lift mechanism of claim 5, wherein said first hinge is a dual hinge connecting said first link and said second link to said base.

7. The spare wheel lift mechanism of claim 6, wherein said second hinge is a dual hinge connecting said first link and said second link to said bracket.

8. The spare wheel lift mechanism of claim 7, wherein said torsion bar includes a first section forming a first hinge pin for said first hinge.

9. The spare wheel lift mechanism of claim 8, wherein said torsion bar includes a second section forming a second hinge pin for said first hinge.

10. The spare wheel lift mechanism of claim 9, wherein said linkage includes a flange and said torsion bar includes a third section that engages said flange.

11. The spare wheel lift mechanism of claim 10, wherein said base includes two opposed flanges having a first set of opposed apertures and a second set of opposed apertures.

12. The spare wheel lift mechanism of claim 11, wherein said first section of said torsion bar extends through said first set of opposed apertures and said second section of said torsion bar extends through said second set of opposed apertures.

13. The spare wheel lift mechanism of claim 1, further including a counter balancing element connecting said support to said holder and biasing said support toward said access position.

14. A motor vehicle incorporating the spare wheel assist mechanism set forth in claim 1.

15. A method of assisting an individual with access to a spare wheel stored in a storage compartment of a motor vehicle, comprising:
    holding said spare wheel on a support that his displaceable between a storage position within said storage compartment and a raised, access position; and
    biasing, by a torsion bar, said support toward said access position so as to reduce effort of said individual required to raise said support and said spare wheel.

16. The method of claim 15, including holding said spare wheel so that said spare wheel at least partially projects from a body of the motor vehicle when in said access position.

* * * * *

UNITED STATES PATENT AND TRADEMARK OFFICE
CERTIFICATE OF CORRECTION

PATENT NO. : 9,771,111 B2
APPLICATION NO. : 15/003117
DATED : September 26, 2017
INVENTOR(S) : Armando Gonzalez Valdes et al.

It is certified that error appears in the above-identified patent and that said Letters Patent is hereby corrected as shown below:

In the Claims

In Claim 15 at Column 6, Line 13, please replace "his" with ---is---.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*